C. H. SANDAHL.
TREE PROTECTOR.
APPLICATION FILED SEPT. 17, 1913.
1,089,012.
Patented Mar. 3, 1914.
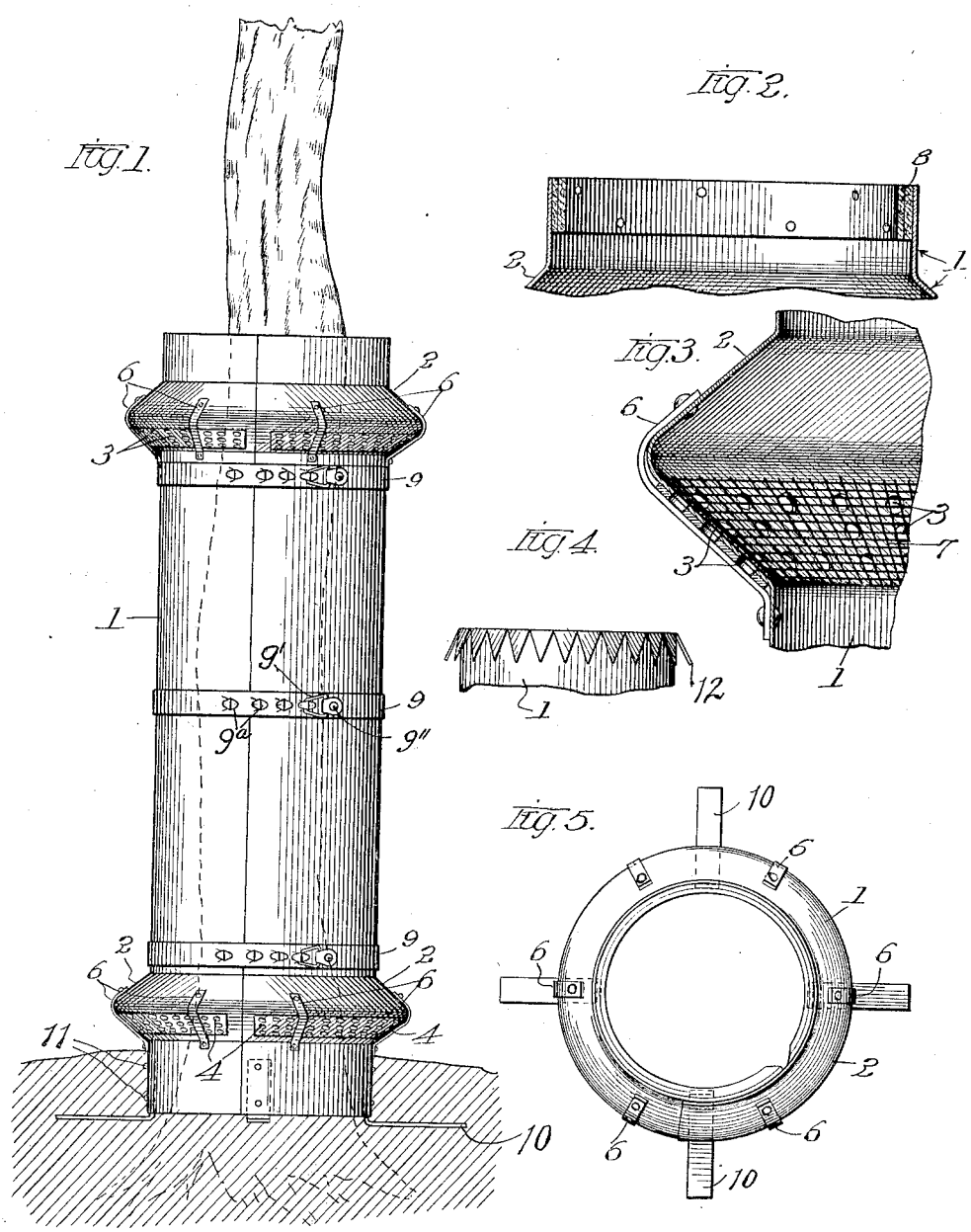

UNITED STATES PATENT OFFICE.

CARL HUGO SANDAHL, OF McPHERSON, KANSAS.

TREE-PROTECTOR.

1,089,012.  Specification of Letters Patent.  Patented Mar. 3, 1914.

Application filed September 17, 1913. Serial No. 790,173.

*To all whom it may concern:*

Be it known that I, CARL HUGO SANDAHL, a citizen of the United States, residing at McPherson, in the county of McPherson and State of Kansas, have invented certain new and useful Improvements in Tree-Protectors, of which the following is a specification.

This invention relates to improvements in tree protectors and its object is to produce a device of this class comprising a cylindrical metal jacket formed with two or more bulged annular portions which portions are apertured to admit air and screened to keep out insects and the said apertured portions are covered with apertured plates removably retained in place by metal straps passing thereover and secured to the jacket; the purpose of this arrangement being to regulate the amount of air admitted to the tree; to keep out excessively cold air from young trees, etc. The bulged portions of the jacket permit the same to be fitted to a tree having a knotty trunk or a curved trunk and, moreover, to keep a tree in shape that would otherwise be inclined to grow crooked and unsightly; for trees inclined to grow crooked two or more of my protectors may be placed about the tree one upon the other thus limiting the amount of curvature of the trunk.

With the foregoing and other objects in view the invention consists in the combination and arrangement of parts to be hereinafter fully described in the following specification, pointed out in the claims and illustrated in the accompanying drawing which forms a part of said specification and in which—

Figure 1 is a view of my improved tree protector applied to a tree. Fig. 2 is a sectional detail showing the lining at the top of my protector. Fig. 3 is a section through one of the bulged portions of the device. Fig. 4 is a modification of the top of the device. Fig. 5 is a plan of Fig. 1.

Like reference characters indicate corresponding parts throughout the several views.

My tree protector comprises the approximately cylindrical jacket 1 formed with annular bulged portions 2. Below the crest in the bulged portion the metal is apertured as at 3 and the apertured portion covered by a sliding apertured plate 4 which is retained in position by straps 6 secured to the jacket. Within the bulged portion of the jacket a screen 7 is disposed which will admit air to the tree but keep out insects. The top of the jacket is lined with a suitable soft lining as at 8 and the said jacket is retained in position upon the tree by adjustable locking straps 9 which are each formed with hooks 9' secured by a button 9'' to the strap and adapted for releasable engagement with tongues 9$^a$ formed integral with the straps and disposed at an angle therewith. The tongues 9$^a$ are formed at varying distances from one end of the strap and the hook 9' is carried at the opposite end of the strap so that the strap can be used as a girdle to retain the jacket 1 upon the trunks of trees of varying thicknesses.

The position of the holes in the bulged portion of the jacket is such that snow and sleet will not be admitted therethrough and in heavy storms some of the plates, on the side of the tree away from the wind may be opened and the others completely or partly closed. The protector is especially adapted to trees to be tapped as the tree can be tapped in alinement with the openings in the bulged portion of the jacket and the sap withdrawn without exposing the balance of the tree to the inclemency of the weather. The jacket 1 has its lower extremity embedded in the ground and anchored in position by angular supporting legs 10 which are secured to said jacket by suitable fastening means 11. In Fig. 4 a modification of the jacket is shown, the only change in the same being in the upper end which is serrated as at 12 and this portion bent back almost upon the body of the jacket to prevent children or others from climbing upon the jacket.

What is claimed is:—

1. As a tree protector, a cylindrical jacket formed with annular bulged portions apertured below the crest of the bulge, sliding apertured plates disposed over the apertured portions of said jacket, supports for said plates and locking straps for said jacket.

2. As a tree protector, a cylindrical jacket formed with annular bulged portions apertured below the crest of the bulge, slidable means carried by said jacket and disposed over the apertured portions in the bulged portions thereof for opening or closing the apertures therein and screens disposed in the apertured portions of said jacket.

In testimony that I claim the foregoing as my own I have hereto affixed my signature in the presence of two subscribing witnesses.

CARL HUGO SANDAHL.

Witnesses:
Wm. L. Aspegren,
E. Jernberg.

Copies of this patent may be obtained for five cents each, by addressing the "Commissioner of Patents, Washington, D. C."